United States Patent [19]

Young

[11] Patent Number: 5,117,475
[45] Date of Patent: May 26, 1992

[54] FIBER OPTIC CONNECTOR

[75] Inventor: Joseph C. Young, Cincinnati, Ohio

[73] Assignee: General Electric Company, Cincinnati, Ohio

[21] Appl. No.: 693,260

[22] Filed: Apr. 29, 1991

[51] Int. Cl.⁵ ............................................. G02B 6/26
[52] U.S. Cl. ........................................ 385/81; 385/82; 385/84; 385/87
[58] Field of Search ............... 350/96.20, 96.21, 96.22, 350/96.23; 385/81, 82, 84, 87, 102, 104, 106, 111

[56] References Cited

U.S. PATENT DOCUMENTS

| | | | |
|---|---|---|---|
| 4,135,782 | 1/1979 | Besuhaire | 350/96.21 |
| 4,181,401 | 1/1980 | Jensen | 350/96.21 |
| 4,273,412 | 6/1981 | Hillegonds | 350/96.20 |
| 4,397,523 | 8/1982 | Feinbloom et al. | 350/96.20 |
| 4,486,072 | 1/1982 | Roberts | 350/96.21 |
| 4,562,632 | 1/1986 | Parchet | 29/281.1 |
| 4,585,302 | 4/1986 | Schoen | 350/96.20 |
| 4,591,231 | 5/1986 | Kaiser et al. | 350/96.18 |
| 4,687,292 | 8/1987 | Krausse | 350/96.21 |
| 4,730,889 | 3/1988 | Becker et al. | 350/96.20 |
| 4,730,892 | 3/1988 | Anderson et al. | 350/96.21 |
| 4,744,626 | 5/1988 | Mery | 350/96.20 |
| 4,744,629 | 5/1988 | Bertoglio et al. | 350/96.20 |
| 4,812,006 | 3/1989 | Osborn et al. | 350/96.21 |
| 4,813,760 | 3/1989 | Tanaka et al. | 350/96.21 |
| 4,815,811 | 3/1989 | Crosnier et al. | 350/96.20 |
| 4,863,235 | 9/1989 | Anderson et al. | 350/96.21 |
| 4,875,749 | 1/1989 | Mori et al. | 350/96.18 |
| 4,902,090 | 2/1990 | Tanaka et al. | 350/96.20 |

Primary Examiner—Brian Healy
Attorney, Agent, or Firm—Jerome C. Squillaro; Bernard E. Shay

[57] ABSTRACT

The present invention comprises a connector adapted to receive fiber cables. The connector comprises a housing including a first opening and a second opening which includes a first beveled portion. The connector further comprises a means for holding and aligning a cable and being adapted to slidably fit into the first opening, a wedge means adapted to slidably fit into the second opening, and means for fastening the wedge means to the housing. A means for preventing free rotation of the wedge means in absence of the holding and aligning means is also included. The second opening is machined such that the wedge means is forced against the holding and aligning means as the wedge means is moved into the second opening.

7 Claims, 5 Drawing Sheets

FIBER OPTIC CONNECTOR

The U.S. Government has rights in this invention pursuant to contract F33657-84-C-0264 awarded by the United States Air Force.

FIELD OF THE INVENTION

The present invention relates, in general, to a connector for detachably holding the end of a cable (e.g. optical fibers), and more particularly, to a connector utilizing a wedge to detachably mount optical fibers to a terminal.

BACKGROUND OF THE INVENTION

Fiber optic connectors are known for interconnecting optical fibers or mounting optical fibers to a terminal in an end-to-end fashion to provide optical transmission therebetween. In aircraft engine applications fiber optic connectors maybe used to connect a fiber optic scanner to a light source and photo detector for the purpose of measuring blade vibration, blade twist, axial displacement, and other parameters. In this type of an application it is very important that the optical fibers are properly aligned and rigidly connected to ensure accurate data transmission.

FIG. 1 illustrates a connector used in such applications. The connector 110 has setscrews 120 mounted in setscrew holes 121 to hold the fiber optic cables (not shown) in place in connector holes 130. Setscrew holes 121 are normally spaced equally along the periphery of connector 110. Connector 110 may be held in a terminal (not shown), such as a light source, with a setscrew (not shown).

In connectors such as the one illustrated in FIG. 1, it may be difficult to access the setscrews. In addition, the direct contact between the setscrews and the fiber optic cables may deform the cable material. It would be advantageous to design a connector wherein the mounting mechanism did not deform the cables, thus, decreasing the insertion tolerances and improving alignment. It would also be advantageous to design a connector wherein the cables are removable without accessing the periphery of the connector. Furthermore, it would be advantageous to design a connector such that the cable may be securely fastened without deformation or misalignment.

SUMMARY OF THE INVENTION

The present invention comprises a connector adapted to receive fiber cables. The connector comprises a housing including a first opening and a second opening. The connector further comprises a means for holding and aligning a cable that is adapted to slidably fit into the first opening, a wedge means adapted to slidably fit into the second opening, and means for fastening the wedge means to the housing. A means for preventing free rotation of the wedge means in absence of the holding and aligning means may also be included. The second opening is machined to form a beveled portion such that the wedge means is forced against the holding and aligning means as the wedge means is moved into the second opening.

BRIEF DESCRIPTION OF THE DRAWINGS

The novel features of the invention are set forth with particularity in the appended claims. The invention, both as to organization and method of operation together with further objects and advantages thereof, will be more fully understood from the following detailed description taken in conjunction with the accompanying drawings in which:

DETAILED DESCRIPTION OF THE INVENTION

Figure 2:
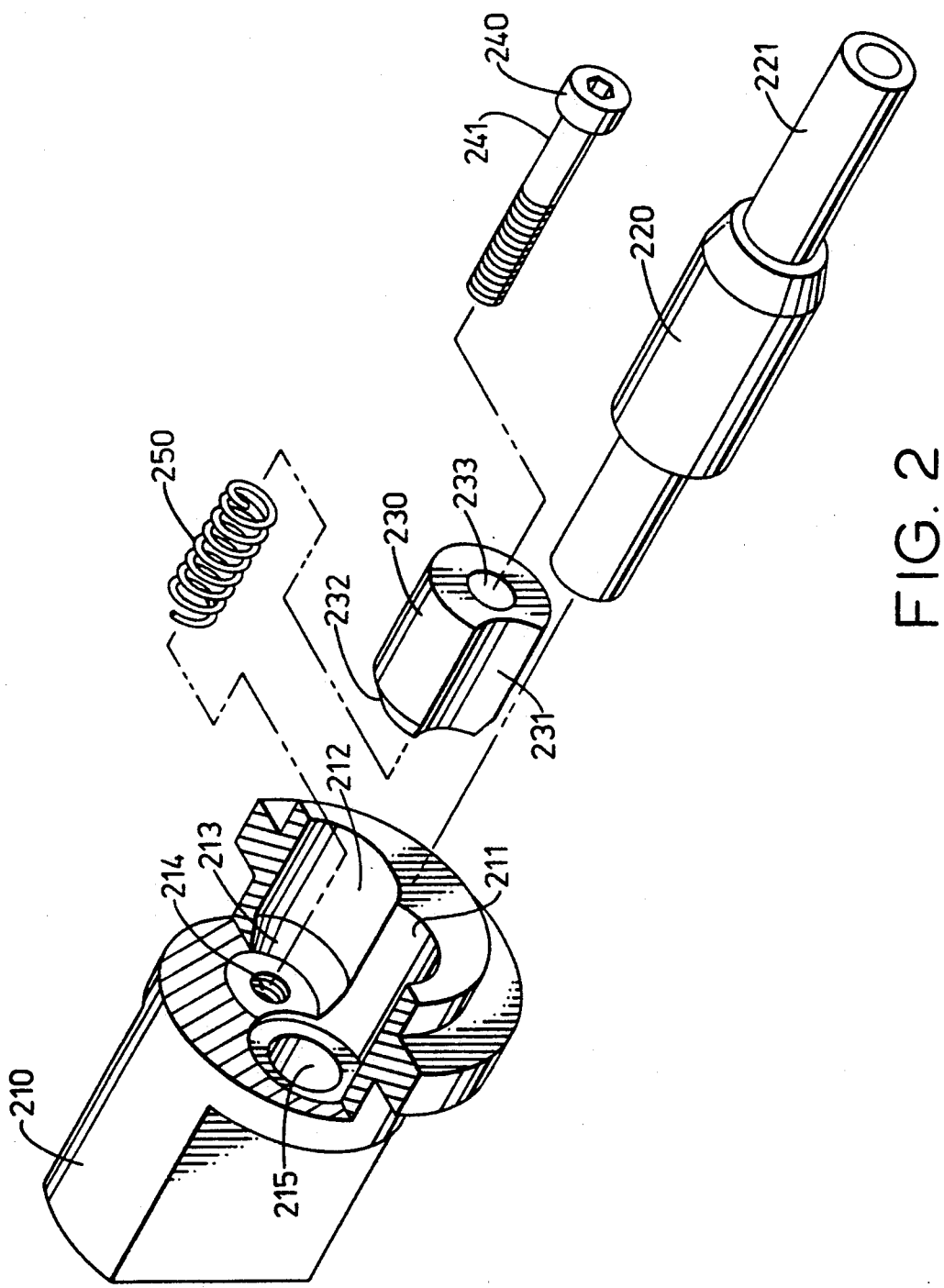
FIG. 2 is an exploded view of one embodiment of the connector according to the present invention including a cutaway view of the connector housing.

FIG. 2 illustrates an exploded view of one embodiment of a connector according to the present invention including a cutaway view of housing 210. Housing 210 includes a first opening 211 which includes a hole 215 at its interior end and a second opening 212 which includes a first beveled portion 213 and a hole 214 at its interior end. A fitting 220 is adapted to hold and align a cable 221, for example a fiber optic cable, and is adapted to slidably fit into first opening 211. A wedge 230 is adapted to slidably fit into second opening 212. A cap screw 240 for fastening wedge 230 to housing 210 and a compression spring 250 for preventing free rotation of wedge 230 in absence of fitting 220 are also included.

In this embodiment, wedge 230 sits in second opening 212 and is held in place by screw 240 such that fitting 220 may be inserted into first opening 211 contacting surface 231 of wedge 230. Surface 231 of wedge 230 is contoured to conform to the outside diameter of fitting 220. Hole 214 is threaded such that when screw 240 is tightened, wedge 230 is forced into second opening 212. Wedge 230 includes beveled surface 232 adapted to conform to beveled surface 213 of second opening 212. The interaction between beveled surface 232 and beveled surface 213 forces wedge 230 against fitting 220 thus holding fitting 220 securely in first opening 211. Bore 233 of wedge 230 is larger than body 241 of screw 240, allowing wedge 230 to move radially when screw 240 is threaded into hole 214. Spring 250 may be included to prevent wedge 230 from rotating as fitting 220 is inserted and removed. Alternatively, a keyway or other means could be used to prevent wedge 230 from rotating.

Figure 3:
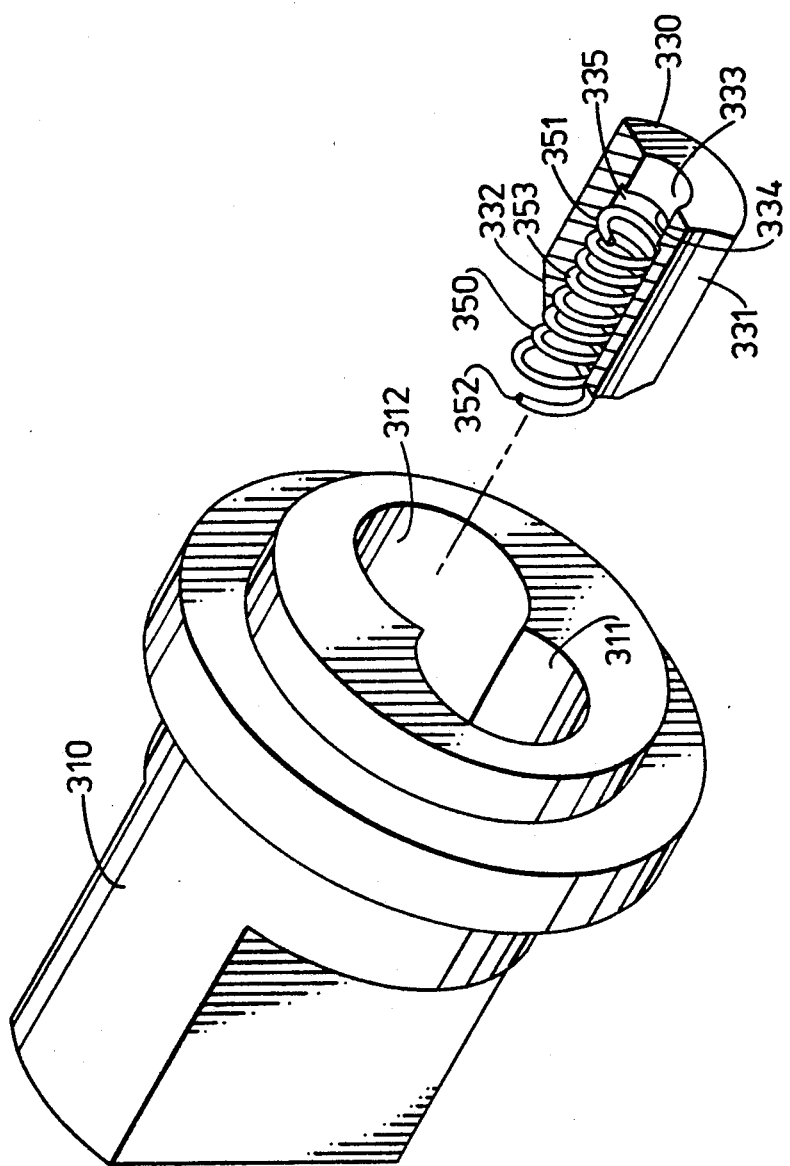
FIG. 3 is an exploded view illustrating one embodiment of the invention including a cutaway view of the wedge.

FIG. 3 is an exploded view illustrating one embodiment of a connector according to the present invention. In FIG. 3, wedge 330 is illustrated in cutaway view. In FIG. 3, spring 350 is inserted into bore 333 of wedge 330. Wedge 330 is inserted into second hole 312 of housing 310. The frictional forces created by the interaction of first 351 and second 352 ends of spring 350 with inside surface 334 of wedge 330 and interior end (not shown) of second opening 312 respectively, prevent wedge 350 from rotating during the insertion and removal of the cable (not shown) into first opening 311. In addition, frictional forces caused by the interaction of surface 353 of spring 330 and internal surface 335 of wedge 350 also prevent wedge 330 from rotating during the insertion and removal of the cable (not shown). Wedge 330 includes beveled portion 332 and contoured surface 331.

Figure 4:
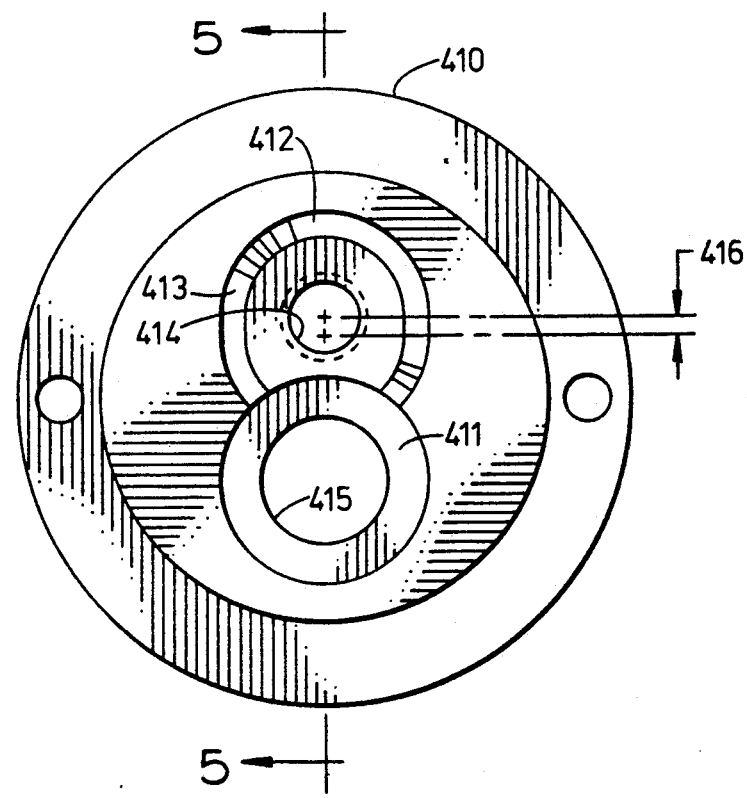
FIG. 4 is a drawing illustrating a front view of a connector according to the present invention.

FIG. 4 is a drawing illustrating a front view of a connector 410 according to the present invention. In FIG. 4, second opening 412 includes elongation 416 such that the wedge (not shown) can move towards hole 411 by sliding along beveled portion 413 (not shown) to securely hold the cable (not shown). Threaded hole 414 is adapted to receive a screw (now shown). Hole 415 is adapted to receive, for example, a fiber optic cable.

Figure 5:
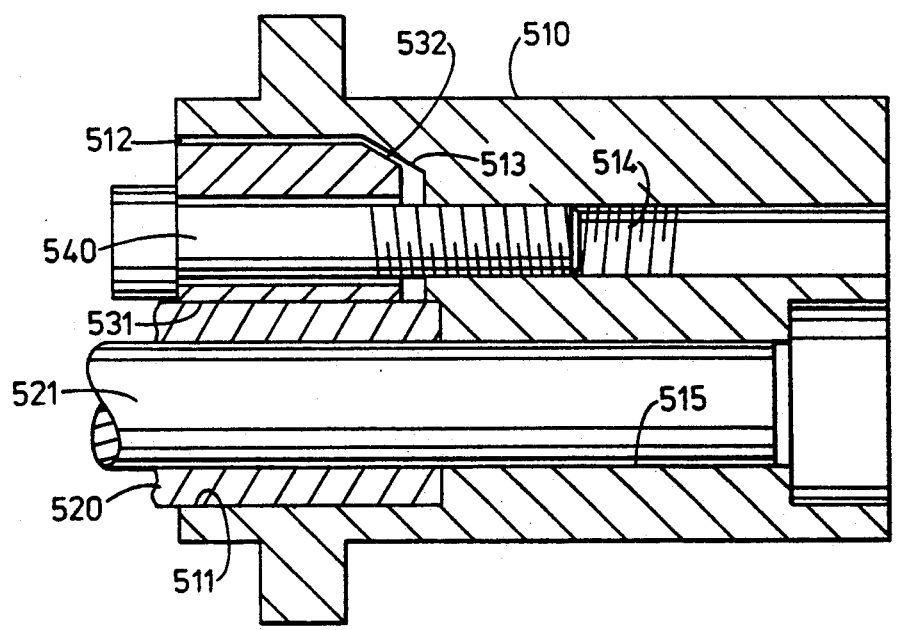
FIG. 5 is a cutaway view illustrating the beveled surfaces of a connector according to the present invention.

FIG. 5 is a section view along A—A in FIG. 4, illustrating the interior surfaces and, particularly, the beveled surfaces of connector 510 according to the present invention. As screw 540 is tightened in threaded hole 514, beveled surface 532 of wedge 530 mates with beveled surface 513 and the result is a downward movement of wedge 530. Fitting 510 is mounted in first opening 511 with cable 521 extending into hole 515. Hard contact between surface 531 of wedge 530 and fitting 520, results in a rigid and aligned connection.

Figure 6:
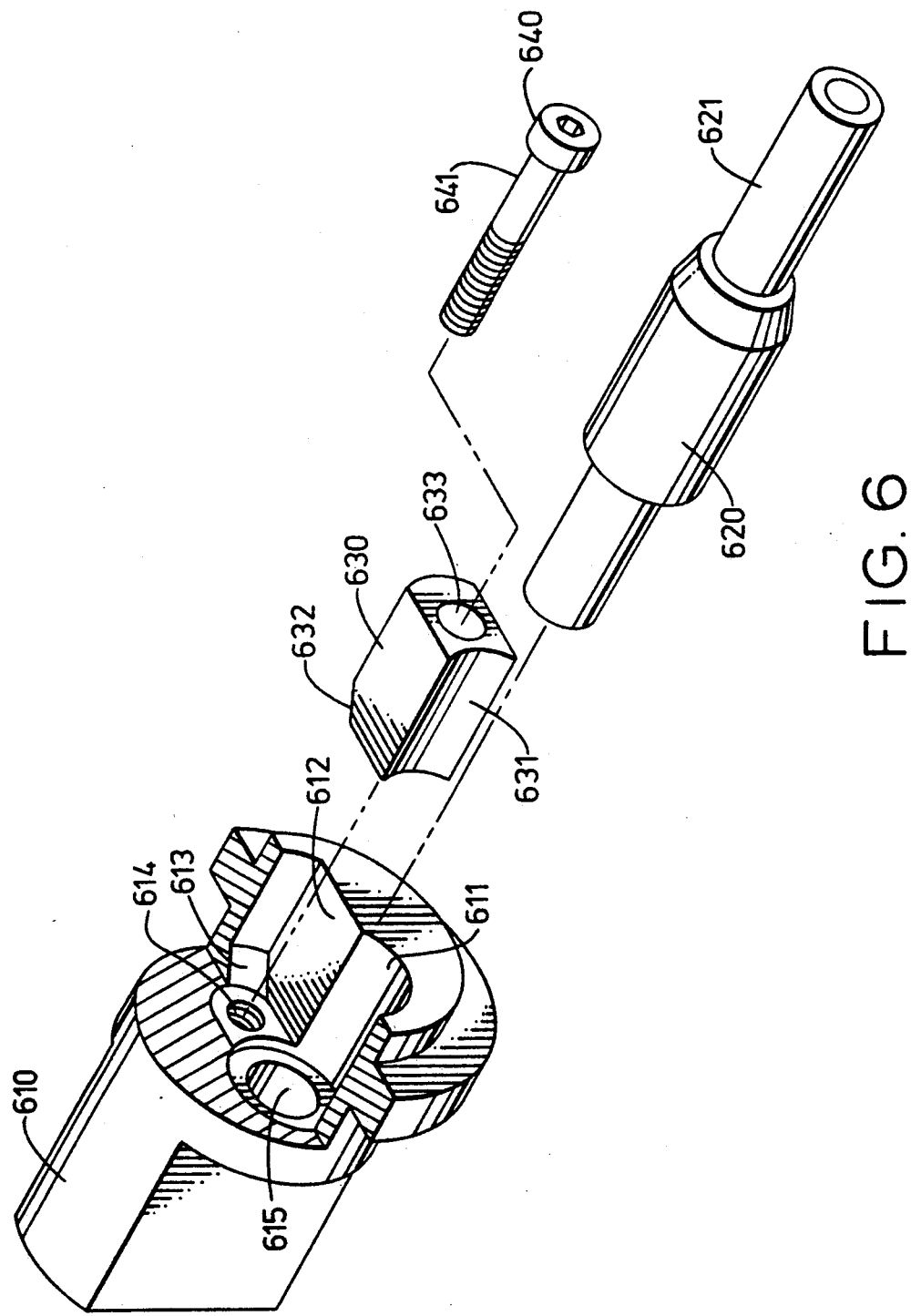
FIG. 6 is an exploded view of a further embodiment of the connector according to the present invention including a cutaway view of the housing body.

FIG. 6 illustrates an exploded view of a further embodiment of the present invention, including a cutaway view of the housing 610. Housing 610 includes a first opening 611 which includes a hole 615 at its interior end and a second opening 612 which includes a first beveled portion 613 and a threaded hole 614 at its interior end. A fitting 620 is adapted to hold and align a cable 621 and is adapted to slidably fit into first opening 611. A wedge 630 is adapted to slidably fit into second opening 612. A cap screw 640 for fastening wedge 630 to housing 610 is also included. First opening 611 is shaped to prevent wedge 630 from rotating as fitting 620 is inserted and removed.

In this embodiment, wedge 630 sits in second opening 612 and is held in place by screw 640 such that fitting 620 may be inserted into first opening 611, contacting surface 631 of wedge 630. Surface 631 of wedge 630 is contoured to conform to the outside diameter of fitting 620. Hole 614 is threaded such that when screw 640 is tightened, wedge 630 is forced into second opening 612. Wedge 630 includes beveled surface 632 adapted to conform to beveled surface 613 of second opening 612. The interaction between beveled surface 632 and beveled surface 613 forces wedge 630 against fitting 620, thus holding fitting 620 securely in first opening 611. Bore 633 of wedge 630 is larger than body 641 of screw 640, allowing wedge 630 to move toward first opening 611 when screw 640 is threaded into hole 614.

Figure 1:
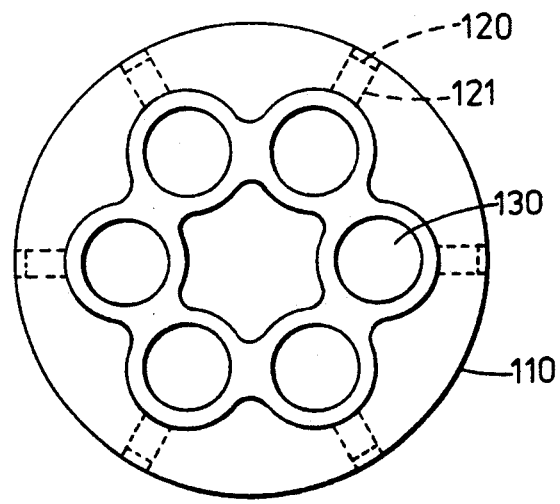
FIG. 1 is a schematic of a cluster connector.
Figure 7:
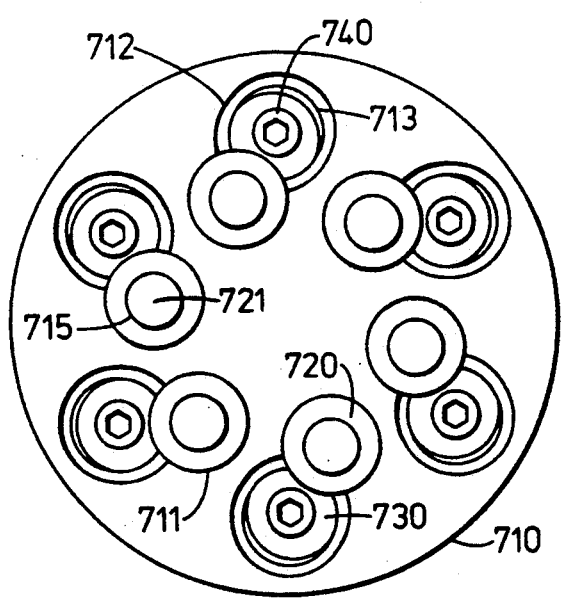
FIG. 7 is a drawing illustrating a front view of a connector according to the present invention adapted to receive a plurality of cables.

FIG. 7 is a drawing illustrating a front view of a further embodiment of the present invention. This embodiment illustrates how the present invention would be altered to connect a plurality of cables. While only the first embodiment of the invention is shown in its plural form, it should not limit the scope of this invention.

Housing 710 includes a plurality of first openings 711 and a plurality of second openings 712 which include beveled portions 713 at its interior end. A plurality of fittings 720 are adapted to hold and align a plurality of cables 721 and are adapted to slidably fit into first openings 711. A plurality of wedges 730 are adapted to slidably fit into second openings 712. A plurality of cap screws 740 for fastening wedges 730 to housing 710 and a plurality of compression springs (not shown) for preventing free rotation of wedges 730 in absence of fittings 720 are also included.

In this embodiment, wedges 730 sit in second openings 712 and are held in place by screws 740 such that fittings 720 may be inserted into first openings 711, contacting surfaces 731 of wedges 730. Surface 731 of wedges 730 are contoured to conform to the outside diameter of fittings 720. When screws 740 are tightened, wedges 730 are forced into second openings 712. Wedges 730 include beveled surfaces adapted to conform to beveled surface 713 of second openings 712. The interaction between the beveled surface of wedges 730 and beveled surfaces 713 forces wedges 730 against fittings 720, holding fittings 720 securely in first openings 711. The bores of wedges 730 are larger than body 741 of screws 740 allowing wedges 730 to move toward fittings 720 as screws 740 are tightened. Springs (not shown) may be included to prevent wedges 730 from rotating as fittings 720 are inserted and removed.

This novel connector thus provides a single unitary device by which a plurality of optical fiber cables can be attached to a terminal with proper alignment and a rigid connection.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

We claim:
1. A connector comprising:
   a housing including first and second openings, said second openings including a first beveled portion;
   means for holding and aligning a cable and being adapted to slidably fit into said first opening;
   a plurality of wedge means adapted to slidably fit into said second openings; and
   means for fastening said wedge means to said housing; and
   means for preventing free rotation of said wedge means during insertion and removal of said holding and aligning means.

2. A connector comprising:
   a housing including first and second openings said second openings, including a first beveled portion;
   means for holding and aligning a cable and being adapted to slidably fit into said first opening;
   a plurality of wedge means adapted to slidably fit into said second openings; and
   means for fastening said wedge means to said housing; and
   said wedge means includes a contoured surface adapted to fit said holding and aligning means and a second beveled portion adapted to mate with said first beveled portion.

3. A connector comprising:
   a housing including first and second openings said second openings, including a first beveled portion;
   means for holding and aligning a cable and being adapted to slidably fit into said first opening;
   a plurality of wedge means adapted to slidably fit into said second openings; and
   means for fastening said wedge means to said housing; and said second openings are machined such that said wedge means is forced against said holding and alignment means as said wedge means is moved into said second openings.

4. A connector comprising:
a housing including a first and second opening, said first opening including a hole at its interior end, said second opening including a first beveled portion and hole at its interior end;
means for holding and aligning a cable and being adapted to slidably fit into said first opening; and
a wedge means adapted to slidably fit into said second opening, said wedge means including a contoured surface adapted to conform to said holding and aligning means and a second beveled portion adapted to mate with said first beveled portion wherein said second opening is machined such that said wedge means is forced against said holding and aligning means as said wedge means is moved into said second opening.

5. A connector according to claim 4 further comprising:
a screw for fastening said wedge means 30 to said housing.

6. A connector according to claim 5 further comprising:

a spring for preventing free rotation of said wedge means during insertion and removal of said holding and aligning means.

7. A connector comprising:
a housing including a first and second openings, said first opening including a hole at its interior end, said second opening including a first beveled portion and hole at its interior end;
means 20 for holding and aligning a cable and being adapted to slidably fit into said first opening;
a wedge means adapted to slidably fit into said second opening, said wedge means including a contoured surface adapted to fit said holding and alignment means and a second beveled portion adapted to mate with said first beveled portion wherein said second opening is machined such that said wedge means is forced against said holding and aligning means as said wedge means is moved into said second opening;
a cap screw for fastening said wedge means to said housing; and
said second opening including means adapted to prevent said wedge means from rotating during insertion and removal of said holding and aligning means.

* * * * *